US011632517B2

(12) United States Patent
Babaei

(10) Patent No.: US 11,632,517 B2
(45) Date of Patent: *Apr. 18, 2023

(54) UNIFICATION SUBLAYER FOR MULTI-CONNECTION COMMUNICATION

(71) Applicant: Cable Television Laboratories, Inc., Louisville, CO (US)

(72) Inventor: Alireza Babaei, Herndon, VA (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/461,761

(22) Filed: Aug. 30, 2021

(65) Prior Publication Data

US 2021/0392289 A1 Dec. 16, 2021

Related U.S. Application Data

(63) Continuation of application No. 16/167,182, filed on Oct. 22, 2018, now Pat. No. 11,128,834, which is a
(Continued)

(51) Int. Cl.
*H04N 7/06* (2006.01)
*H04N 21/236* (2011.01)
(Continued)

(52) U.S. Cl.
CPC ......... *H04N 7/066* (2013.01); *H04L 12/4633* (2013.01); *H04L 45/24* (2013.01);
(Continued)

(58) Field of Classification Search
CPC ...... H04L 1/0025; H04L 69/32; H04W 48/18; H04W 4/18; H04W 4/005; H04W 36/24
See application file for complete search history.

(56) References Cited

U.S. PATENT DOCUMENTS 5,481,312 A 1/1996 Cash et al.
6,798,838 B1 9/2004 Ngo
(Continued)

FOREIGN PATENT DOCUMENTS

EP 0902590 A3 11/2001
WO 2012058823 A1 5/2012
(Continued)

OTHER PUBLICATIONS

Analysis of Multihoming in Mobile IPv6 draft-ietf-monami6-mipv6-analysis-05, Internet engineering task force, Montavont, May 3, 2008.
(Continued)

*Primary Examiner* — Romani Ohri
(74) *Attorney, Agent, or Firm* — PdZ Patent Law, PLLC

(57) ABSTRACT

Managing Internet Protocol (IP) flows to produce multi-connection communication is contemplated, such as but not necessarily limited to managing a single IP flow simultaneously through disparate physical layers (PHYs). A unification sublayer may be configured as a logical interface between a network layer and a data link layer and/or the disparate PHYs to facilitating partitioning of IP packets included in the IP flow.

10 Claims, 3 Drawing Sheets

Related U.S. Application Data continuation of application No. 15/391,544, filed on Dec. 27, 2016, now Pat. No. 10,111,136, which is a continuation of application No. 14/562,677, filed on Dec. 6, 2014, now Pat. No. 9,532,090.

(60) Provisional application No. 61/912,733, filed on Dec. 6, 2013.

(51) Int. Cl.

| | | |
|---|---|---|
| *H04N 21/239* | (2011.01) | |
| *H04N 21/63* | (2011.01) | |
| *H04N 21/2343* | (2011.01) | |
| *H04L 47/2483* | (2022.01) | |
| *H04L 45/24* | (2022.01) | |
| *H04L 47/2425* | (2022.01) | |
| *H04W 4/18* | (2009.01) | |
| *H04W 28/02* | (2009.01) | |
| *H04N 21/262* | (2011.01) | |
| *H04N 21/6379* | (2011.01) | |
| *H04N 21/643* | (2011.01) | |
| *H04N 21/8547* | (2011.01) | |
| *H04L 12/46* | (2006.01) | |
| *H04W 28/10* | (2009.01) | |
| *H04N 5/067* | (2006.01) | |
| *H04W 88/10* | (2009.01) | |
| *H04L 67/02* | (2022.01) | |
| *H04W 84/12* | (2009.01) | |

(52) U.S. Cl.
CPC ...... *H04L 47/2433* (2013.01); *H04L 47/2483* (2013.01); *H04N 5/067* (2013.01); *H04N 21/236* (2013.01); *H04N 21/239* (2013.01); *H04N 21/23611* (2013.01); *H04N 21/234327* (2013.01); *H04N 21/262* (2013.01); *H04N 21/631* (2013.01); *H04N 21/6379* (2013.01); *H04N 21/64322* (2013.01); *H04N 21/8547* (2013.01); *H04W 4/18* (2013.01); *H04W 28/0215* (2013.01); *H04W 28/10* (2013.01); *H04L 67/02* (2013.01); *H04W 84/12* (2013.01); *H04W 88/10* (2013.01)

(56) References Cited

U.S. PATENT DOCUMENTS

| | | | |
|---|---|---|---|
| 7,818,779 | B2 | 10/2010 | Matsuzaki et al. |
| 9,307,217 | B1 | 4/2016 | Day |
| 9,516,356 | B2 | 12/2016 | Hamzeh |
| 9,532,090 | B2 | 12/2016 | Babaei |
| 2004/0016000 | A1 | 1/2004 | Zhang et al. |
| 2004/0261113 | A1 | 12/2004 | Paul et al. |
| 2005/0243835 | A1 | 11/2005 | Sharma et al. |
| 2008/0141317 | A1 | 6/2008 | Radloff et al. |
| 2008/0158339 | A1 | 7/2008 | Civanlar et al. |
| 2009/0074074 | A1 | 3/2009 | Au et al. |
| 2010/0186048 | A1 | 7/2010 | Waller |
| 2010/0260254 | A1 | 10/2010 | Kimmich et al. |
| 2010/0287296 | A1 | 11/2010 | Riggert et al. |
| 2010/0322090 | A1 | 12/2010 | Zhang et al. |
| 2011/0083156 | A1 | 4/2011 | Martinez et al. |
| 2011/0090794 | A1* | 4/2011 | Cherian ............ H04W 36/0027 370/235 |
| 2012/0263041 | A1 | 10/2012 | Giaretta et al. |
| 2013/0021968 | A1* | 1/2013 | Reznik .................. H04L 45/245 370/328 |
| 2013/0064198 | A1 | 3/2013 | Krishnaswamy et al. |
| 2013/0083661 | A1* | 4/2013 | Gupta ............... H04W 28/0247 370/235 |
| 2013/0114446 | A1* | 5/2013 | Liu ....................... H04W 24/10 370/252 |
| 2013/0239150 | A1 | 9/2013 | Chen et al. |
| 2013/0268985 | A1 | 10/2013 | Kim et al. |
| 2014/0002598 | A1 | 1/2014 | Kim et al. |
| 2014/0082054 | A1 | 3/2014 | Denoual et al. |
| 2014/0086045 | A1 | 3/2014 | Bao et al. |
| 2014/0086154 | A1 | 3/2014 | Sajadieh |
| 2014/0201329 | A1 | 7/2014 | Himayat et al. |
| 2014/0213310 | A1* | 7/2014 | Yeh ....................... H04W 72/08 455/501 |
| 2014/0313989 | A1 | 10/2014 | Doken et al. |
| 2014/0369198 | A1* | 12/2014 | Rinne .................. H04W 40/02 370/235 |
| 2014/0369329 | A1* | 12/2014 | Lee .................... H04L 12/5692 370/338 |
| 2015/0117310 | A1 | 4/2015 | Zexian et al. |
| 2015/0156774 | A1 | 6/2015 | Urie |
| 2019/0208162 | A1 | 7/2019 | Hamzeh |

FOREIGN PATENT DOCUMENTS

| | | |
|---|---|---|
| WO | 2013068787 A1 | 5/2013 |
| WO | 2013162615 A1 | 10/2013 |

OTHER PUBLICATIONS

Cellular-Wi-Fi Integration, A comprehensive analysis of the technology and standardization roadmap, Jun. 2012, InterDigital, Inc.

Flow Bindings in Mobile IPv6 and Network Mobility (NEMO) Basic Support, Internet engineering task force request for comment 6089, Tsirtsis, Jan. 2011.

IP Flow Performance Measurement Framework, draft-chen-ippm-coloring-based-ipfpm-framework-02, internet engineering task force, Chen, Jul. 3, 2014.

Mobility Support in IPv6, Internet engineering task force request for comment 6275, Perkins, Jul. 2011.

Multiple Care-of Addresses Registration, Internet engineering task force request for comment 5648, Wakikawa, Oct. 2009.

Specification of the IP Flow Information Export (IPFIX) Protocol for the Exchange of Flow Information, Internet engineering task force request for comment 7011, Claise, Sep. 2013.

Traffic Selectors for Flow Bindings, Internet engineering task force request for comment 6088, Tsirtsis, Jan. 2011.

Written Opinion in corresponding PCT application PCT/US14/68960, generated by USPTO as ISA, dated Mar. 16, 2015.

\* cited by examiner

UNIFICATION SUBLAYER FOR
MULTI-CONNECTION COMMUNICATION

CROSS-REFERENCE TO RELATED
APPLICATIONS

This application is a continuation of U.S. patent application Ser. No. 16/167,182, filed Oct. 22, 2018, which is a continuation of U.S. patent application Ser. No. 15/391,544, filed Dec. 27, 2016, now U.S. Pat. No. 10,111,136, which is a continuation of U.S. patent application Ser. No. 14/562,677, filed Dec. 6, 2014, now U.S. Pat. No. 9,532,090, which in turn claims the benefit of U.S. provisional patent application No. 61/912,733 filed Dec. 6, 2013. Each of the aforementioned patent applications is hereby incorporated by reference.

TECHNICAL FIELD

The present invention relates to managing Internet Protocol (IP) flows, such as but not necessarily limited to managing a single IP flow simultaneously through disparate physical layers (PHYs).

BACKGROUND

The Wi-Fi Alliance defines Wi-Fi as any wireless local area network (WLAN) products complying with the Institute of Electrical and Electronics Engineers' (IEEE) 802.11 standards, such as but not necessarily limited to IEEE 802.11: Telecommunications and information exchange between systems—Local and metropolitan area networks—Specific requirements-Part 11: Wireless LAN Medium Access Control (MAC) and Physical Layer (PHY) Specifications, 2012, the disclosures of which are hereby incorporated by reference in their entireties herein. Long-Term Evolution (LTE) relates to a standard for wireless communication of high-speed data for mobile phones and other device based on the Global System for Mobile Communications (GSM)/Enhanced Data rates for GSM Evolution (EDGE) and Universal Mobile Telecommunications System (UMTS)/High Speed Packet Access (HSPA) network technologies developed by the 3rd Generation Partnership Project (3GPP) as specified in its Release 8 and 9 document series and/or TS 36.201, 36.300, 36.304, 36.306, 36.321, 36.322, 36.323, 36.331, 36.401 and 36.306, the disclosures of which are hereby incorporated by reference in their entireties herein.

Integrated Wi-Fi/LTE small cells are becoming more prevalent. The Wi-Fi access point (AP) and the LTE eNodeB (eNB) maybe collocated in this architecture and may share some of the resources (power, probably antennas, etc.). In a home environment, the same backhaul can be used for Wi-Fi and LTE traffic (DOCSIS, DSL, etc.), see Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein. The LTE and Wi-Fi radios, in such integrated access points, work independently on licensed and unlicensed bands, respectively. In addition, many wireless devices have both LTE chips and Wi-Fi chips embedded in them (smart phones, 4G/Wi-Fi tablets, etc.). In a home environment, such devices coexist with Wi-Fi-only devices (laptops, smart watches, Wi-Fi-only tablets, etc.) and LTE-only devices (regular cell phones, etc.).

A dual-radio wireless device is either in a single-mode (LTE-only or Wi-Fi only), or in case both radios are active simultaneously, they serve different Internet Protocol (IP) flows. In the former case, the IP packets use the services delivered by either the Wi-Fi PHY/MAC or the LTE PHY/MAC. In the latter case, although both radios can be active simultaneously, two different IP connections are needed (e.g. two different care-of-address in mobile IP) and the radios serve different IP flows. In a typical architecture, both radios, and hence both licensed and unlicensed spectrum, cannot serve a single or the same IP flow. In addition, the two radios work independently and the PHY and MAC parameters chosen by them are not decided jointly. One non-limiting aspect of the present invention proposes a unification sublayer to enable both Wi-Fi and LTE radios to serve the packets delivered by a single IP connection with capabilities to jointly decide their associated radio parameters.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
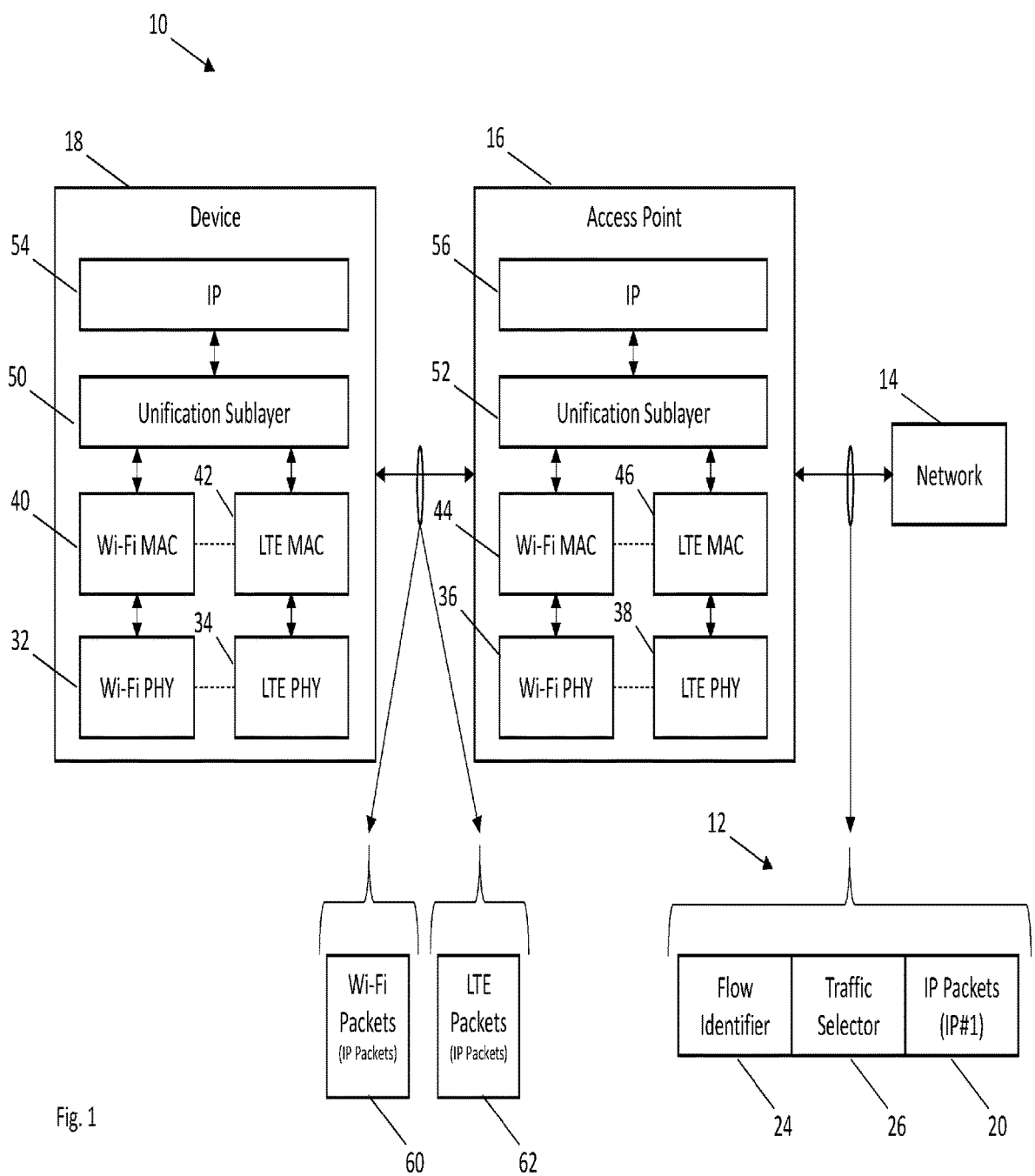
FIG. 1 illustrates a system for managing flows in accordance with one non-limiting aspect of the present invention.

FIG. 1 illustrates a system 10 for managing flows 12 in accordance with one non-limiting aspect of the present invention. The flows 12 may correspond with any data transmission dependent on a session, stream or other signaling carried through one or more network elements 14, 16, 18 according to Internet Protocol (IP) based processes. The Internet Engineering Task Force (IETF) request for comment (RFC) 7011, entitled Specification of the IP Flow Information Export (IPFIX) Protocol for the Exchange of Flow Information, the disclosure of which is hereby incorporated by reference in its entirety herein, describes a flow as traffic carried on a data network as packets or frames 20. It notes packets belonging to a particular flow 12 have a set of common properties, such as one or more packet header fields (e.g., destination IP address), transport header fields (e.g., destination port number), or application header fields (e.g., RTP header fields [RFC3550]). Optionally, a set of packets 20 represented by a flow 12 may be empty at least in so far as the flow may represent zero or more packets. A flow record may contain information about a specific flow 12 that was observed at a network element having capabilities sufficient to operate as an observation point. The flow record may contain measured properties of the flow 12 (e.g., the total number of bytes for all the flow's packets) and in some cases characteristic properties of the flow (e.g., source/destination IP addresses).

Various mechanism may be employed to construct a flow 12, such as but not necessarily limited to Stream Control Transmission Protocol (SCTP) where the corresponding flow may be a transport session known as a SCTP association, Transport Control Protocol (TCP) where the corresponding flow may be a transport session known as a TCP connection uniquely identified by the combination of IP addresses and TCP ports used and User Datagram Protocol (UDP) where the corresponding flow may be a transport session known as a UDP session uniquely identified by the combination of IP addresses and UDP ports used. IETF RFC 6089, entitled Flow Bindings in Mobile IPv6 and Network Mobility (NEMO) Basic Support, the disclosure of which is hereby incorporated by reference in its entirety, defines a concept of binding one or more flows to particular IP addresses, such as a care-of address sufficient to facilitate directing a flow from a home address to another location (see IETF RFC 5648, entitled Multiple Care-of Addresses Registration, the disclosure of which is hereby incorporated by reference in its entirety, for additional detail regarding use of a care-of addresses).

RFC 6089 notes the following flow related terminology:

Flow: A flow is a sequence of packets for which the mobile node (MN) desires special handling either by the home agent (HA), the corresponding node (CN) or the mobility anchor point (MAP).

Traffic Selector: One or more parameters that can be matched against fields in the packet's headers for the purpose of classifying a packet. Examples of such parameters include the source and destination IP addresses, transport protocol number, the source and destination port numbers, and other fields in IP and higher-layer headers.

Flow binding: It consists of a traffic selector, and one or more binding identifiers (BIDs). IP packets from one or more flows that match the traffic selector associated with the flow binding are forwarded to the BIDs associated with the same flow binding.

Flow Identifier: A flow identifier uniquely identifies a flow binding associated with a mobile node. It is generated by a mobile node and is cached in the table of flow binding entries maintained by the MN, HA, CN, or MAP.

FIG. 1 illustrates an exemplary configuration where the network elements 14, 16, 18 facilitating an IP flow 12 correspond with a network 14, an access point 16 and a device 18. The network 14 may correspond with any type of network having capabilities sufficient to facilitate providing any number of services to the device via a session or other mechanism supporting the IP flow, such as but not necessary limited to voice over Internet protocol (VoIP), conventional video, non-conventional video (e.g HD, VHD, UHD), Web traffic, file or data downloads (file transfer protocol (FTP)) and other types of services. The services may be sourced from a cable television provider, an Internet service provider (ISP), a cellular telephone provider, and over-the-top (OTT) content provider or virtually any other type of service providers having capabilities sufficient to facilitate transmitting data necessary to support the attendant services according to IP-based standards. The foregoing references to IP flows are provided for exemplary non-limiting purposes to demonstrate one use of the present invention mechanism by which IP flows may be defined and differentiated. The IP flow 12 may correspond with any flow having a plurality of packets addressed to the same IP address, e.g., an IP version 4 (IPv4) or IP version 6 (IPv6) destination address associated with the device or other destination, or otherwise commonly associated.

The IP flow 12 is shown to include a flow identifier 24, one or more traffic selectors 26 and a plurality of IP packets 20 addressed to an IP address of the device (IP #1) 18. The flow identifier 24 may corresponding with that described above to provide a unique identifier sufficient for differentiating the IP flow 12 from other IP flows being transmitted to the access point 16. The traffic selector or multiple traffic selectors 26 may correspond with that described above to differentiate services associated with corresponding IP packets 20, e.g., a plurality of IP packets 20 having the same destination address (IP #1) may be included within the flow 12 to provide multiple services to the device. The present invention is predominately described with respect to the IP flow 12 being sourced from a provider connected to the network (e.g., Internet or service provider) for delivery via the access point 16 to the device 18 such that a corresponding direction of the IP flow 12 may be considered to be downstream. The present invention is not necessary so limited and fully contemplates its use and application in facilitating similar IP flows in an upstream direction, such as from the device 18 to the source or other destination connected to the network 14 via the access point 16.

One non-limiting aspect of the present invention contemplates managing the IP flow 12 using disparate physical layers (PHYs) 32, 34, 36, 38 of the access point 16 and the device 16. The PHY 32, 34, 36, 38 of the device 18 and the access point 16 may correspond with radio interfaces or other interfaces having capabilities sufficient to physically exchange signals. FIG. 1 illustrates an exemplary configuration where the access point 26 acts as a wireless signaling source having capabilities sufficient to facilitate exchanging wireless signals with the device 18 using one or both of a Wi-Fi operable PHY (Wi-Fi PHY) 32, 36 and an LTE operable PHY (LTE PHY) 34, 38. The Wi-Fi PHY 32, 36 and the LTE PHY 34, 38 may correspond with features included on each of the device 18 and the access point 16 to facilitate Wi-Fi signaling and LTE signaling, i.e., the exchange of Wi-Fi packets and/or LTE packets. The Wi-Fi and LTE PHY 32, 34, 36, 38 may correspond with layers commensurate with those associated with the Open Systems Interconnection model (OSI) defined by the International Organization for Standardization (ISO), referenced as ISO/IEC 7498-1, the disclosure of which is hereby incorporated by reference in its entirety. The Wi-Fi and LTE PHYs 32, 34, 36, 38 may operate with corresponding Wi-Fi and LTE data link layers 40, 42, 44, 46 (media access control (MAC) layers) to facilitate signal processing, addressing and other operations necessary for preparing signaling (e.g., packets, frames, etc.) for physical exchange through a corresponding PHY 32, 34, 36, 38.

One non-limiting aspect of the present invention contemplates a unification sublayer 50, 52 being configured as a logical interface between the Wi-Fi PHY 32, 36 and LTE PHY 34, 38 and a network/transport layer 54, 56. The network/transport layer 54, 56 may be an IP layer having capabilities sufficient to facilitate processing signaling physically exchanged through the Wi-Fi and LTE PHYs 32, 34, 36, 38 for use with a processor, application or other logically functioning element of the device 18 and the access point 16 operable in response to the data included therein. The network/transport layer 54, 56 is labeled as an IP layer as one non-limiting aspect of the present invention contemplates transporting IP flows or data communicated according to IP-based protocols through the disparate PHY layers 32, 34, 36, 38 of the device 18 and the access point 16, e.g., the Wi-Fi and LTE PHYs 32, 34, 36, 38. The IP layer 54, 56 may be configured as a non-IP layer without deviating from the scope and contemplation of the present invention in the event other network/transport protocols are utilized to support the flow 12. The use an IP layer 54, 56 is predominately described as IP-based communications, particularly those relying on the illustrate IP flow 12, are relatively prevalent and operable with many devices.

The unification layer 50, 52 may be configured to facilitate processing IP flows between the Wi-Fi and LTE MAC 40, 42, 44, 46 and PHY layers 32, 34, 36, 38 according to a partitioning process contemplated herein to leverage capabilities particular to Wi-Fi and LTE based communications. The Wi-Fi and LTE based communications are predominately noted for exemplary purposes as representative of interfaces used in many devices and without necessarily intending to limit the applicability of the present invention as other wireless and/or wireline interfaces having disparate operating considerations may similarly be used without deviating from the scope and contemplation of the present invention. Wireless signaling between the device 18 and the access point 16 may experience differing levels of throughput, quality of service (QoS), signaling range and any number of other operational considerations dependent on any number of factors, e.g., the access point 16 may be allocated limited licensed spectrum for LTE signaling in comparison to the unlicensed spectrum for Wi-Fi (or vice versa), the access point 16 may experience throughput degradation or funneling when supporting communications with other Wi-Fi connected devices (e.g., when supporting community Wi-Fi in the manner described in U.S. patent application Ser. No. 14/537,845, entitled Network Traffic Prioritization, the disclosure of which is hereby incorporated by reference in its entirety herein), etc.

The unification sublayer 50, 52 may be configured in accordance with the may be configured to take advantage of capabilities and/order to minimize the disadvantages of the capabilities associated with the LTE and Wi-Fi PHYs 32, 34, 36, 38. The unification sublayer 50, 52 may identify desirable operating conditions for each of the Wi-Fi and LTE PHYs 32, 34, 36, 38 and to partition the IP packets 20 included in the IP flow 12 as a function thereof. The unification sublayer 50, 52 may be configured to buffer the IP packets 20 and thereafter encapsulate an entirety of IP packets 20 within corresponding Wi-Fi and/or LTE packets 60, 62 depending on whether the partitioning dictates subsequent exchange through a corresponding one of the Wi-Fi and LTE PHYs 32, 34, 36, 38. The unification sublayer 50, 52 may be configured to operate within the addressing constraints of the IP flow 12, such as to enable each of the IP packets 20 to be addressed to the same destination address (IP #1) while enabling some of the IP packets 20 to be exchanged through the Wi-Fi PHY 32, 36 and some of the other IP packets 20 to be exchanged through the LTE PHY 34, 38, optionally with the packets 60, 62 being simultaneously exchanged through each of the Wi-Fi and LTE PHYs 32, 34, 36, 38. The ability to facilitate use of the disparate physical layers of the access point 16 and the device 18 to enable transport of the IP flow 20 may be particularly beneficial in enabling the source or other device originating or receiving the IP flow 12 to utilize a single destination/source address (IP #1).

Figure 2:
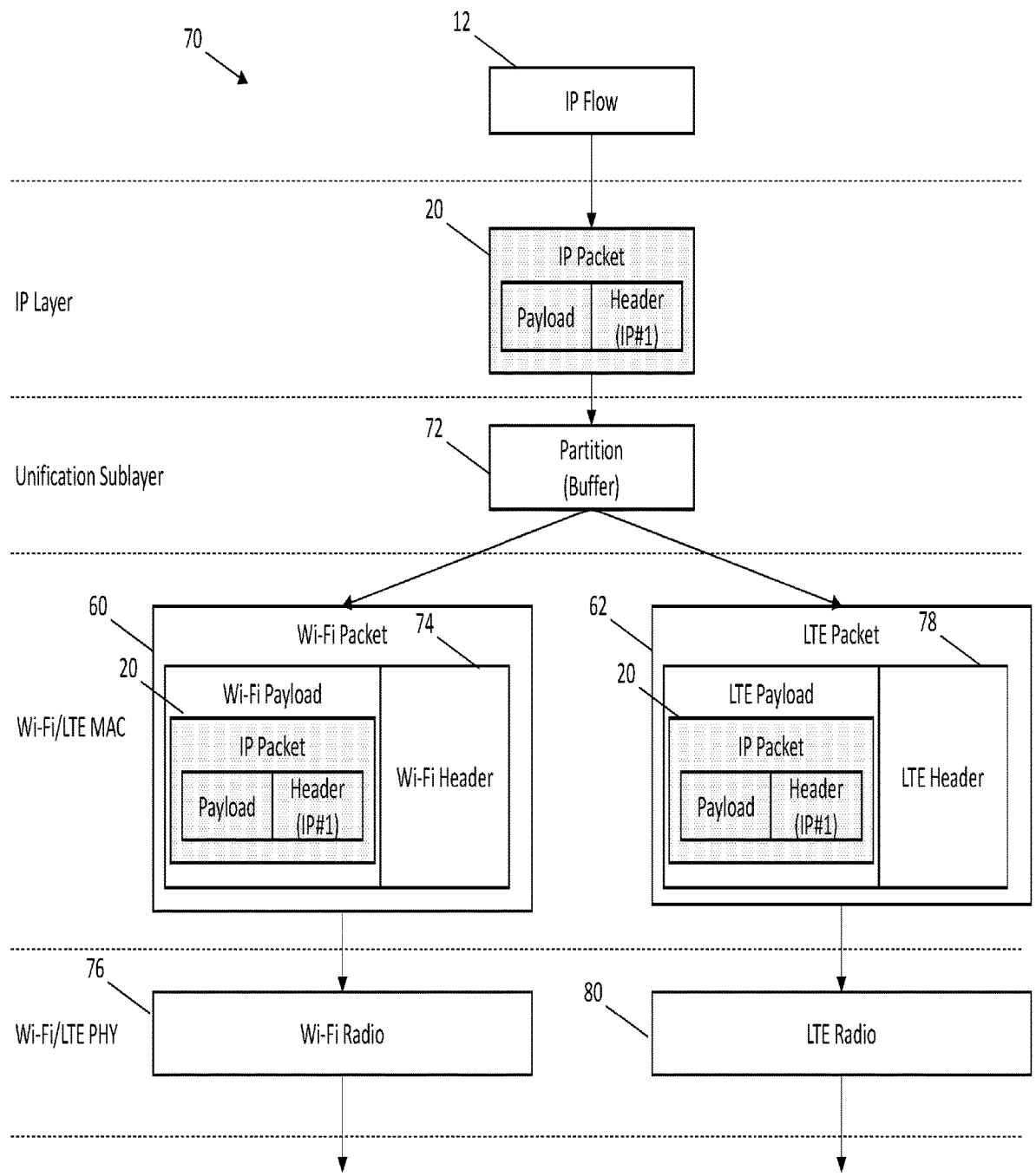
FIG. 2 illustrates a schematic of the disparate physical layer processing contemplated by one non-limiting aspect of the present invention.

FIG. 2 illustrates a schematic 70 of the disparate physical layer processing contemplated by one non-limiting aspect of the present invention. The schematic 70 may apply to upstream IP flows sourced from the device 18 to the access point 16 and/or downstream flows sourced from the access point 18 to the device 16. The upstream flows may correspond with the device 18 performing various processes or receiving various commands for transmitting an IP flow to a destination associated with the network 14 and the attendant processing performed at the device 18 to facilitate transporting at least a portion of the corresponding IP packets 20 through the Wi-Fi and LTE PHYs 32, 34, 36, 38 to the wireless access point 18 for subsequent re-combination and transmission as the IP flow 12 over the network 14. The downstream flows may correspond with the access point 18 performing various processes in response to receiving an IP flow 12 over the network 14 for transport to the device 18 and the attendant processing performed to facilitate transporting at least a portion of the corresponding IP packets 20 through the Wi-Fi and LTE PHYs 32, 34, 36, 38 to the device 18 for subsequent re-combination into the IP flow for use with an application associated therewith.

The processes illustrated in FIG. 2 are shown for exemplary non-limiting purposes to correspond with a downstream flows where an IP flow 12 is received at the access point 16 for wireless transmit to the device 18. As noted above and as appreciated by one having ordinary skill in art, similar processes may be performed at the device 18 to facilitate upstream signaling from the device 18 to the access point 16 and in a reverse order to facilitate re-constructing the IP flow 12. The IP layer 54, 56 may be configured to identify a plurality of IP packets 20 included within the IP flow 12, optionally including identifying the flow identifier, any traffic selectors and/or addressing associated with each IP packet 20. Each received IP packet 20 or the IP packets associated with a particular flow identifier may be routed to the unification layer 50, 52 for a partitioning/buffering process 72. The partitioning/buffering process 72 may include the identification of multiple flows and identifying whether the corresponding IP packets 20 are to be subsequently transported through one or both of the Wi-Fi and LTE PHYs 32, 34, 36, 38. While the present invention fully contemplates transporting IP packets 20 for a particular IP flow through a single one of the Wi-Fi and LTE PHYs 32, 34, 36, 38, the exemplary description hereinafter assumes a partitioning where at least a portion of the IP packets 20 for a particular flow 12 are to be transported through both of the Wi-Fi and LTE PHYs 32, 34, 36, 38.

The buffering portion of the partitioning/buffering operation 72 may include the buffering of IP packets 20 for a period of time sufficient for identifying subsequent routing through one of the Wi-Fi and LTE PHYs 32, 34, 36, 38. The partitioning portion of the partitioning/buffering operation 72 may correspond with the unification layer 50, 52 deciding which portion of the IP packets 20 are to be transported using the Wi-Fi PHY 32, 36 and which portion are to be transported using the LTE PHY 34, 38, and optionally any partitioning adjustments or variations to be performed as conditions change while the IP flow 12 is being transmitted to the device 18. The unification sublayer 50, 52 may operate with the Wi-Fi MAC layer 40, 44 to facilitate generating Wi-Fi packets 60 for the IP packets 20 to be transmitted through the Wi-Fi PHY 32, 36. The Wi-Fi MAC layer 40, 42 may generate the Wi-Fi packets 60 by encapsulating an entirety of each IP packet 20 in one or more corresponding Wi-Fi packets 60, such as by including an entirety of one IP packet as a payload within one Wi-Fi packet 60 having a Wi-Fi header 74. The Wi-Fi header 74 may add forward error correction (FEC), addressing and/or other data necessary to facilitate subsequent transmission of the Wi-Fi packets 60 through a Wi-Fi radio 76. The unification sublayer may operate similarly with the LTE MAC layer 42, 46 to facilitate encapsulating IP packets 20 as payload within LTE packets 62 having LTE headers 78 to facilitate subsequent transmission of the LTE packets 62 through an LTE radio 80.

The device 18 and/or the access point 16 may operate as a dual-radio device operable in an LTE mode, Wi-Fi mode, or dual-radio mode. To make this decision, parameters like number of LTE-only devices, number of Wi-Fi-only devices, number of dual-radio devices, topology and relative positions of devices to each other, the channel condition to each device (for a dual-radio device, channel condition on both licensed and unlicensed spectrum) and device capabilities (MIMO, etc.) may be taken into account to decide whether IP packets should be routed solely to the Wi-Fi PHY (Wi-Fi mode), solely to the LTE PHY (LTE mode) or to both of the Wi-Fi and LTE PHYs (dual-radio mode). Some example decisions may be as follows:

When the channel between the access point 16 and the device 18, or additional devices connected to the same channel or otherwise associated with the access point 16, is time varying on both licensed and unlicensed frequencies, for a given frame/packet, if the channel condition of the unlicensed (licensed) band is much better than that of the licensed (unlicensed) band, the unification sublayer 50, 52 may direct all of the IP traffic to one of the Wi-Fi and LTE radio, which may provide advantageous diversity.

If the channel conditions on both licensed and unlicensed frequencies are good, the unification sublayer 50, 52 may split the IP traffic to both Wi-Fi and LTE radios.

If a dual-radio mode is operating Wi-Fi-only mode and running an application that requires a consistent throughput, when the device 18 is moving away from the access point 16, the LTE radio of the device 18 can become active and as the distance increases so that increasingly larger number of subcarriers can be used to compensate the Wi-Fi throughput loss by communicating more IP packets through the LTE radio 80.

In a scenario where a dual-radio device 18 is close to the access point 16, and an LTE-only device running a throughput-intensive application is far, the unification sublayer 50, 52 may use all of the LTE subcarriers for the far device and connect to the dual-radio device using Wi-Fi.

If the number of Wi-Fi only devices is large, the unification sublayer 50, 52 may direct the traffic destined to a dual radio device to the LTE radio.

Figure 3:
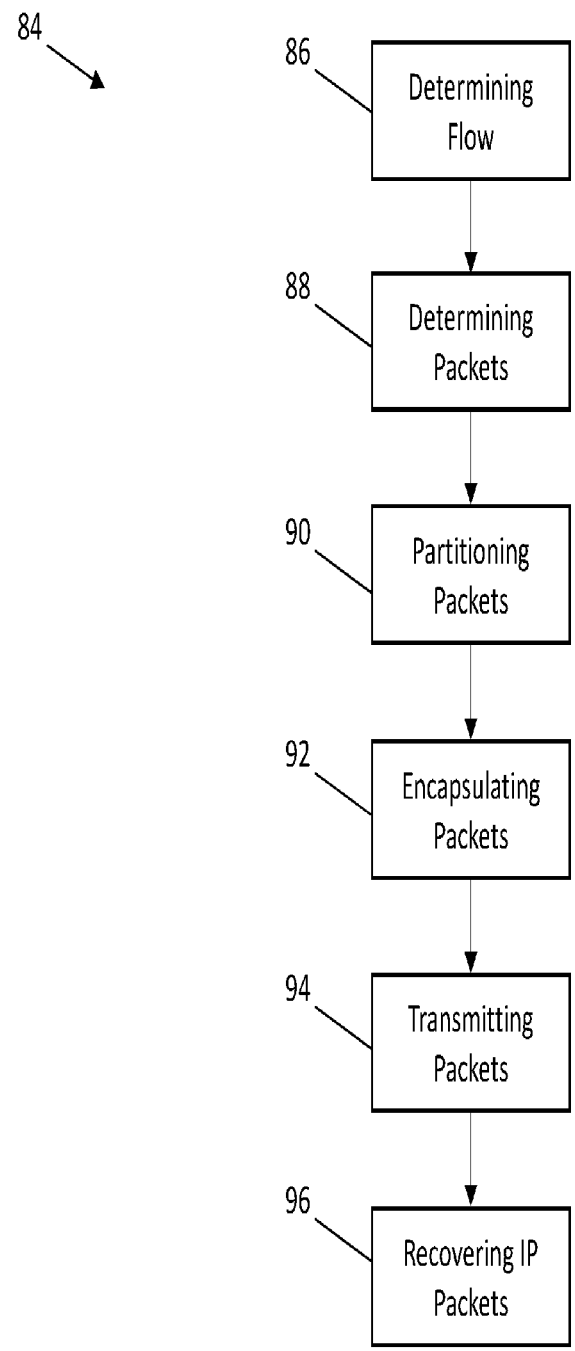
FIG. 3 illustrates a flowchart of a method for managing an IP flow in accordance with one non-limiting aspect of the present invention.

FIG. 3 illustrates a flowchart 84 of a method for managing an IP flow in accordance with one non-limiting aspect of the present invention. The method may be embodied in a non-transitory computer-readable medium having a plurality of non-transitory instructions operable with a device, an access point or other network element having capabilities sufficient to facilitate signaling through to disparate wireless and/or wireline interfaces, such as but not necessary limited to the dual-mode device and access point described above having capabilities sufficient to facilitate exchanging signaling through Wi-Fi and LTE radios. Block 86 relates to determining an IP flow desired for transport in accordance with the present invention. The IP flow may correspond with a plurality of packets transported to a common destination address and associated with a common flow identifier, e.g., each IP packet included within the flow may have the same destination address and be associated with the same flow identifier.

Block 88 relates to determining a plurality of IP packets included within the IP flow. The IP packets may be identified in real-time as the packets are being received as part of the IP flow and/or in advance as a function of outputs from an encoder or other processor tasked with generating the IP flow for transport. In the event the IP flow relates to an upstream transmission, such as from the device 18 to the access point 16, the IP flow may be determined from an application or other feature on the device 18, and in the event the IP flow relates to a downstream transmission, such as from the access point 16 to the device 16, the IP flow may be determined as a function of signaling transported to the access point 16 from a source connected to the network 12. The packets may be individually identified according to headers and/or payloads or other identifying information included therein to facilitate transport of corresponding content/data. In the event frames or other data groupings are utilized in place of or in addition to packets, those additional constructs may be similarly identified and processed according to the operations contemplated herein.

Block 90 relates to partitioning the IP packets to disparate PHYs, such as but not necessarily limited to the Wi-Fi and LTE PHYs. The partitioning may be an ongoing process where each packet retrieved from the IP flow is individually assessed for the purposes of determining whether it should be subsequently transported using one of the Wi-Fi and LTE radios. One non-limiting aspect of the present invention presumes a dual-mode of operation where it may be desirable to partition a single IP flow for simultaneous transmission over the Wi-Fi and LTE radios. As noted above, this dual-mode operation may be implemented for a particular IP flow while a non-dual-mode operation may be implemented for other IP flows, i.e., some IP flows may be transported through both of the Wi-Fi and LTE radios and other IP flows may be transported through one of the Wi-Fi and LTE radios. The partitioning decision may be dynamic and variable such that the partitioning may be constantly adjusted as network operating constraints fluctuate.

Optionally, a traffic selector or other identifier included with the in the IP flow to identify traffic type or other characteristics of the IP packets may be utilized to facilitate the partitioning. The traffic selector partitioning may be used to route a one type of traffic (and the corresponding packets) to one of the Wi-Fi and LTE radios and another type of traffic (and the corresponding packets) to the other one of the Wi-Fi and LTE radios. The traffic selector partitioning may also be used to partition traffic types according to a predetermined relationship, e.g., one traffic type may include a 25/75 split to the Wi-Fi/LTE radios and another traffic type may include a 50/50 split of IP packets between the Wi-Fi/LTE radios. In the event the IP flow is used to carry data for multiple clients, such as when the access point multicast service(s) to multiple devices (the IP low may have a destination address common to each packet as the access point), packets having certain traffic types may directed to the Wi-Fi radio, e.g., for Wi-Fi only devices and/or to utilize unlicensed spectrum, and packets having certain traffic types may be directed to the LTE radio, e.g., for LTE only device and/or to utilize licensed spectrum or diversity.

Blocks 92, 94 relate to encapsulating the IP packets into corresponding Wi-Fi and LTE packets and their subsequent transmission through the corresponding Wi-Fi/LTE radio. The encapsulation may be performed by ensconcing an entirety of each IP packet, including the payload and header as received, within a payload of a corresponding one of the Wi-Fi/LTE packets. Wi-Fi/LTE headers may be respectively added to the Wi-Fi/LTE payloads in order to facilitate transmissions in compliance with the standards associated therewith. Block 96 relates to recovering the IP packets from the Wi-Fi/LTE packets transmitted in Block 94. The recovery of the IP packets may include the unification sublayer facilitating the decapsulation of the Wi-Fi/LTE packets and subsequent collation of the IP packets according to the network/transport layer requirements attendant to IP-based communications, i.e., retrieving the IP packets from the payloads of the Wi-Fi and LTE packets.

As supported above, one non-limiting aspect of the present invention contemplates a unification sublayer that sits on top of the LTE and Wi-Fi. This sub-layer receives the packets from the IP layer and partitions the IP traffic and direct the packets to each of the two available radios. By using this unification sub-layer, the IP layer takes advantage of both available LTE and Wi-Fi radio/spectrum. In addition, this sub-layer may be responsible to merge the MAC layer frames received from the two radios and deliver them to the IP layer. The unification sub-layer provides a logical interface between the Wi-Fi PHY (MAC) and LTE PHY (MAC) such that LTE and Wi-Fi PHY and MAC layers can talk and the parameters chosen by each radio is selected jointly to optimize the overall performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for managing a multi-connection communication network, comprising:
   partitioning a set of data packets into first data packets and second data packets at a first node, at least partially based on capabilities of devices that are operating in the multi-connection communication network;
   encapsulating the first data packets into encapsulated first data packets at the first node;
   encapsulating the second data packets into encapsulated second data packets at the first node;
   transmitting the encapsulated first data packets from the first node to a second node using a first transmission protocol;
   transmitting the encapsulated second data packets from the first node to the second node using a second transmission protocol that is different from the first transmission protocol; and
   communicating between a first physical layer associated with the first transmission protocol and a second physical layer associated with the second transmission protocol via an interface between the first physical layer and the second physical layer.

2. The method of claim 1, further comprising recovering the set of data packets at the second node from the encapsulated first data packets and the encapsulated second data packets.

3. The method of claim 2, where recovering the set of data packets comprises:
   decapsulating the encapsulated first data packets into decapsulated first data packets;
   decapsulating the encapsulated second data packets into decapsulated second data packets; and
   collating the decapsulated first data packets and the decapsulated second data packets.

4. The method of claim 1, wherein the first transmission protocol is a cellular wireless transmission protocol and the second transmission protocol is a Wi-Fi wireless transmission protocol.

5. The method of claim 4, wherein the set of data packets comprises a plurality of data packets addressed to a common destination address.

6. The method of claim 1, wherein the capabilities of devices that are operating in the multi-connection communication network include ability of a device operating in the multi-connection communication network to support multi-input multi-output (MIMO) communication.

7. The method of claim 1, wherein the interface is implemented by a unification sub-layer.

8. The method of claim 7, where partitioning the set of data packets into first data packets and second data packets at the first node is performed by the unification sub-layer.

9. The method of claim 1, further comprising communicating between the first physical layer and the second physical layer via the interface to select (1) first parameters for a first radio associated with the first transmission protocol and (2) first parameters for a second radio associated with the second transmission protocol.

10. The method of claim 9, further comprising selecting the first and second parameters to optimize overall performance of the first and second radios.

* * * * *